R. E. GEARHART & E. E. LLOYD.
MACHINE FOR MOLDING AND CUTTING BUTTER AND THE LIKE.
APPLICATION FILED APR. 29, 1916.

1,285,979.

Patented Nov. 26, 1918.
4 SHEETS—SHEET 1.

Witness
R. S. Hamilton

Inventors:
R. E. Gearhart
and
E. E. Lloyd.

By
their Attorney

R. E. GEARHART & E. E. LLOYD.
MACHINE FOR MOLDING AND CUTTING BUTTER AND THE LIKE.
APPLICATION FILED APR. 29, 1916.
1,285,979.
Patented Nov. 26, 1918.
4 SHEETS—SHEET 2.
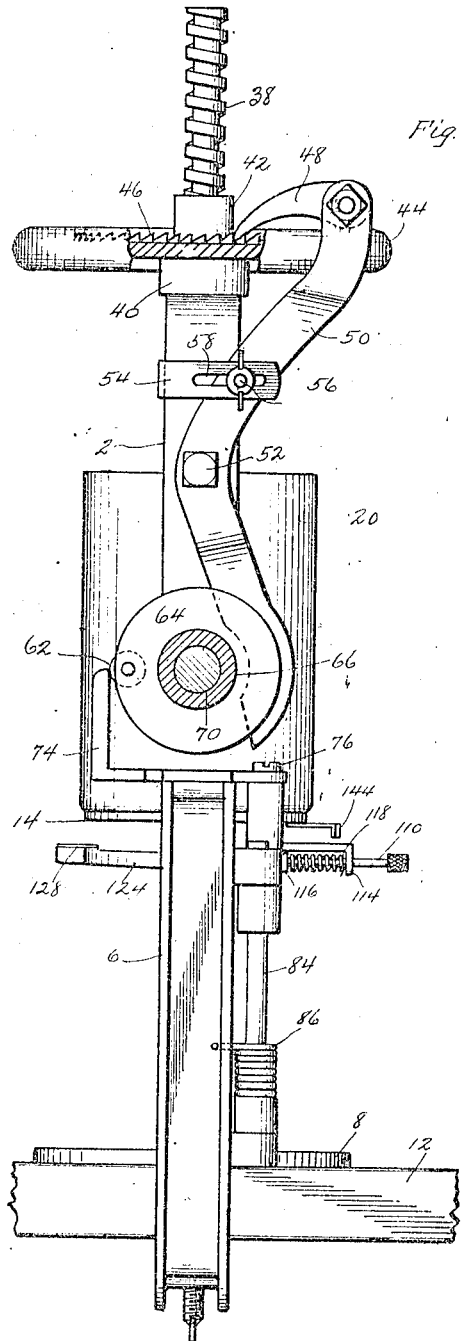
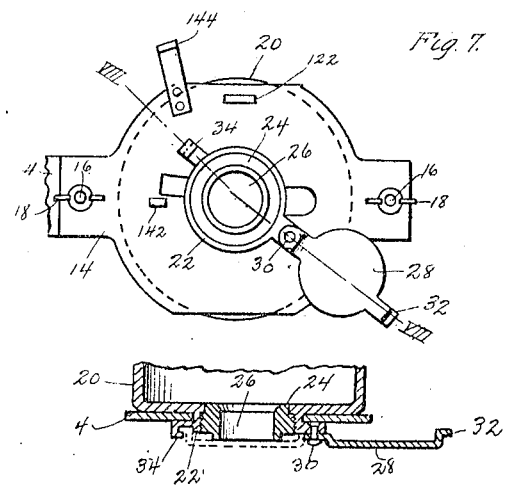
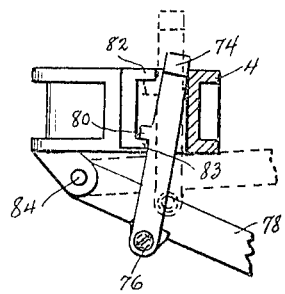
Witness
R. E. Hamilton
Inventors
R. E. Gearhart
and
E. E. Lloyd.
By Chas. W. Gerard
their Attorney.

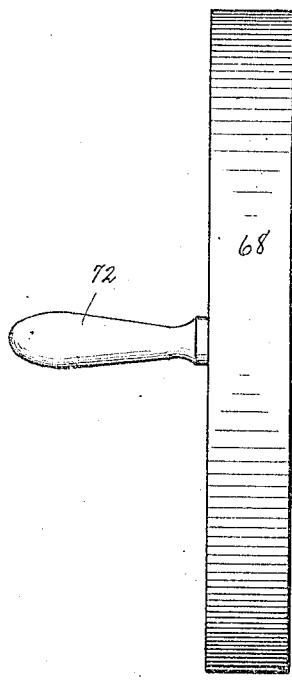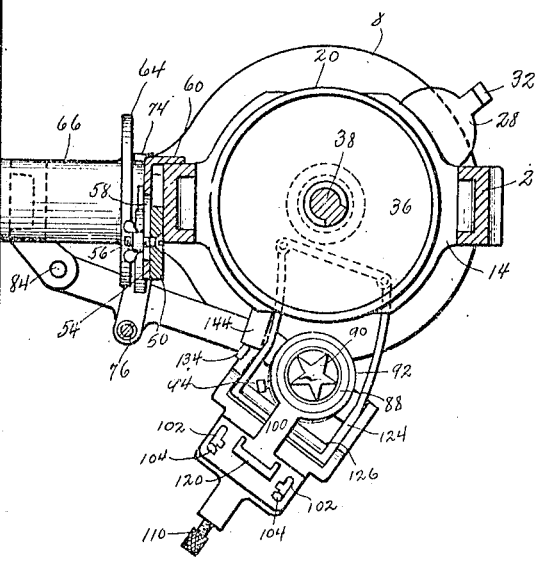

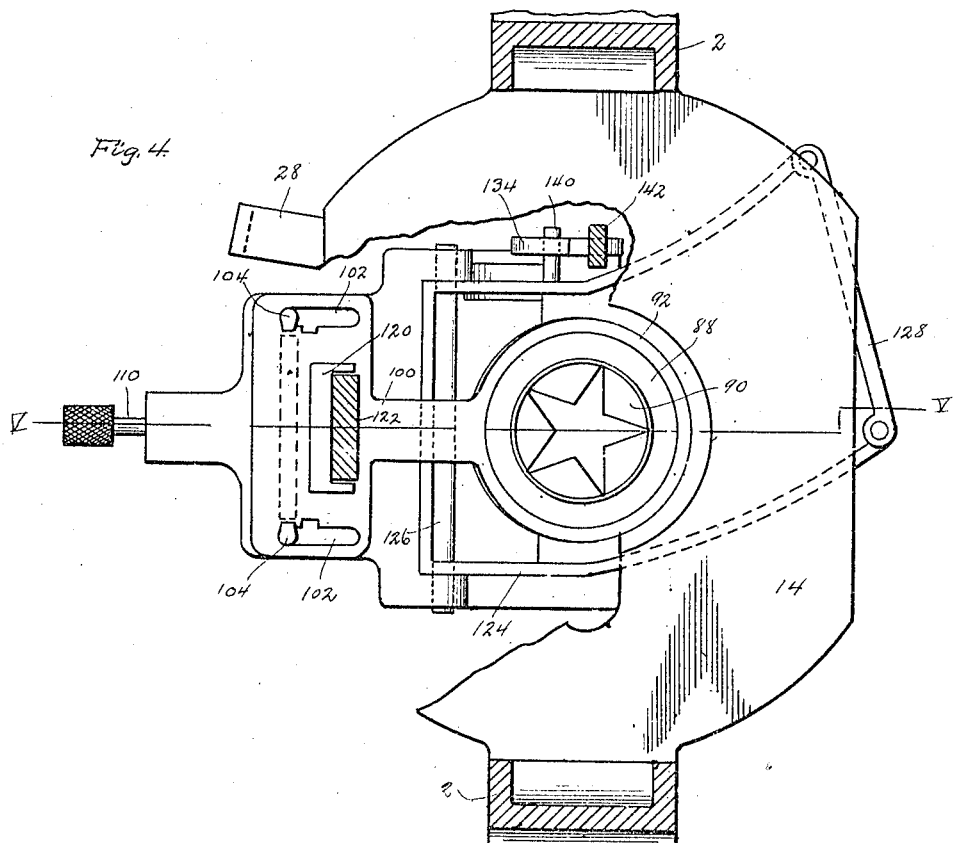

UNITED STATES PATENT OFFICE.

ROY E. GEARHART AND ELDON E. LLOYD, OF MARYVILLE, MISSOURI, ASSIGNORS OF ONE-FOURTH TO LUTHER E. FORSYTHE, ONE-FOURTH TO SAMUEL G. GILLAM, AND ONE-FOURTH TO JOHN Z. CURMUTT, ALL OF MARYVILLE, MISSOURI, AND ONE-FOURTH TO SAID LLOYD.

MACHINE FOR MOLDING AND CUTTING BUTTER AND THE LIKE.

1,285,979.     Specification of Letters Patent.     Patented Nov. 26, 1918.

Application filed April 29, 1916. Serial No. 94,365.

*To all whom it may concern:*

Be it known that we, Roy E. Gearhart and Eldon E. Lloyd, citizens of the United States, residing at Maryville, in the county of Nodaway and State of Missouri, have invented certain new and useful Improvements in Machines for Molding and Cutting Butter and the like, of which the following is a full and exact specification.

This invention relates to machines for use in molding and cutting butter and like material, and has for its principal object to provide an improved machine for producing individual butter molds of the character commonly served in restaurants, hotels or other public eating places.

To this end a machine has been devised which is adapted to rapidly and neatly cut such molds from a mass of butter and imprint a pattern or design thereon of any desired form.

It is also sought to provide a machine of such construction as to cut the desired molds from the body or mass of butter regardless of the form in which this is supplied to the machine.

It is a further object of the invention to construct and arrange the machine to mold and stamp the butter while it is still an integral mass, and thereafter to effect a feeding of the molded and stamped portion prior to severing the same from the remaining portion of the material.

A further proposed object is the provision of an improved cutting mechanism acting to cut and deliver the butter molds with their stamped faces uppermost on coming to rest after delivery.

It is also an object to provide a machine of comparatively simple construction for effectively carrying out the purposes of the invention.

The invention will now be described with reference to the accompanying drawings illustrating one form of embodiment of the improvements which has been devised for fulfilling the objects of the invention, after which those features and combinations deemed to be novel will be set forth and defined in the appended claims.

In the drawings—

Fig. 2 is a side elevation of the same with the operating wheel omitted and its shaft in section;

Fig. 3 is a horizontal section on the line III—III of Fig. 1, but showing the knife and die carrier in retracted position;

Fig. 4 is a similar section on the line IV—IV of Fig. 1 but shown on a larger scale, omitting the butter container and representing certain parts as broken away and others in section;

Fig. 5 is a vertical section on the line V—V of Fig. 4;

Fig. 6 is a detail elevation of the operative relation of the knife and die carrier to the lower end of the butter container, looking in the opposite direction from Fig. 5, the dotted lines representing alternative positions of the parts;

Fig. 7 is a plan view of the lower end of the butter container showing the type of valve used;

Fig. 8 is a section on the line VIII—VIII of Fig. 7; and

Fig. 9 is a fragmentary detail of one of the carrier connections.

Figure 1:
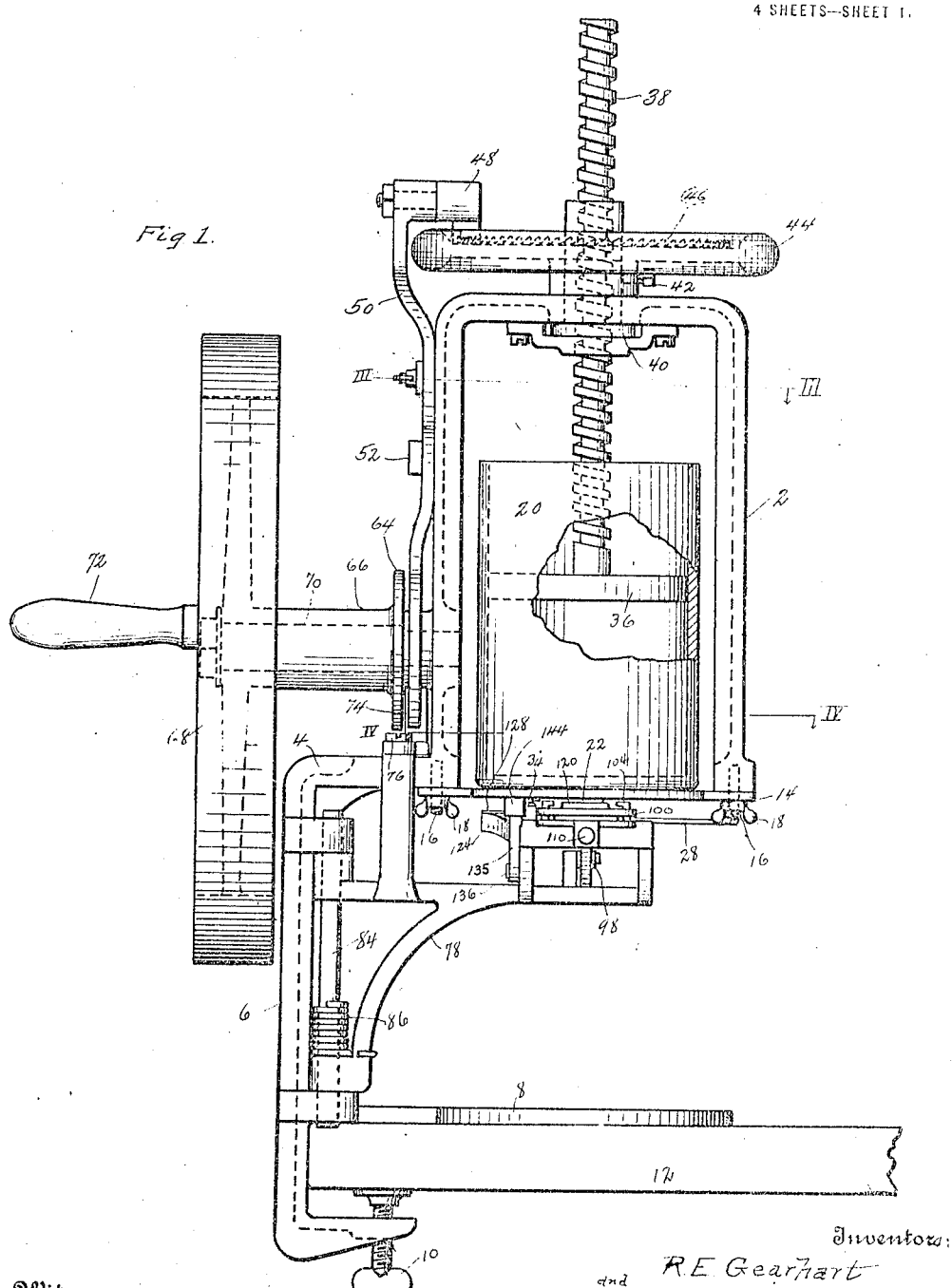
Figure 1 is a rear view of the machine in elevation, with a portion of the butter container partially broken away.

Referring in detail to the drawings, the frame work of the machine comprises a casting of channel section having the yoke portion 2 of inverted-U shape, one branch of which is connected at its lower end by means of a horizontal arm 4 to the supporting upright 6 having the bracket arm 8 and clamping screw 10 whereby the framework of the machine is adapted to be secured to a table or other support 12 in working position. The lower end of the yoke portion 2 of the frame is spanned by a plate 14 secured in place by the fixed bolts 16 and thumb-nuts 18. This plate 14 acts as a support for the butter container or receptacle 20 of any desired form of cross-section, a cylinder being shown, and the same provided with a bottom opening having the marginal flange 22 suitably tapped to receive the externally threaded mold block 24 having a mold passage 26 forming the feed outlet from the receptacle 20. This detachable mold block construction is provided in order that the machine may be adapted to mold the material in various forms of cross-section, the passage 26 being herein illustrated as of cylindrical form. Said passage is provided with a valve 28 (see Figs. 7 and 8) pivoted at 30 to the receptacle 20 and formed with a lip portion 32 adapted for latching engagement with the hook 34 when the valve is closed, as is the case when compressing the butter within the receptacle or container prior to feeding the butter through said passage or feed outlet.

The mechanism for feeding the butter comprises a plunger 36 at the lower end of a feed screw 38 which operates through a nut 40 journaled within the top of the yoke 2 and secured by a set screw 42 to the hub of a feed wheel 44. This wheel 44 is formed with a circular rack 46 with which engages a pawl 48 carried by the upper end of the oscillatory lever 50 pivotally mounted at 52 upon the yoke 2 in such a manner that the lever 50 swings by gravity in its inoperative movements. These gravity-actuated movements of the lever 50 are limited by a stop plate 54 adjustably secured to the lever by means of the bolt 56 and slot 58, said plate having a stop lug 60 adapted to engage the yoke 2. Obviously the adjustment of the plate 54 serves also to vary the operative stroke of the lever 50, which in turn regulates the degree of turn of the feed screw 38 and hence the amount of butter fed for each feeding operation.

The lower end of the lever 50 extends in position to be actuated by a roller 62 mounted on one face of a flange 64 formed on one end of the hub 66 of the fly wheel 68 mounted on a shaft 70 supported from the yoke 2 and provided with a suitable operating handle 72. This roller 62 is also designed to intermittently engage and actuate the angular arm 74 whereby movement is imparted to the cutting and die-stamping mechanism which comprises the following construction.

The arm 74 is pivotally connected at 76 to the knife and die carrying frame 78, said arm 74 being also provided with a lug 80 operating between a pair of stop lugs 82, 83 (see Fig. 9), arranged on the horizontal arm 4 of the framework, and sufficient clearance provided for between said lugs 82, 83 and the yoke 2 to accommodate the necessary horizontal swinging movement of the arm 74, as represented by the dotted lines in Fig. 9. The carrier 78 is pivotally mounted upon the vertical fixed rod 84 carried by the upright 6 and fitted with a coil spring 86 whereby the carrier 78 is held normally in retracted or inoperative position, with the lug 80 of the arm 74 in engagement with the stop lug 83 as in Fig. 9. Referring more particularly to Figs. 3 to 6, these illustrate a die block 88 having a suitable design of stamping die 90' adapted to be projected within the mouth of the mold passage 26. This block 88 is removably mounted within a holder 92 where it is clamped by the set screw 94 (see Fig. 3.) Said holder is formed with an inclined slot 96 for engagement with a roller 98 mounted on the frame of the carrier 78, so that during relative movement between said holder and carrier the former will be projected in a vertical direction. An arm 100 extends rearwardly from the holder 92 and is provided with T-slots 102 (see Fig. 4) for detachable engagement with the headed pins 104 projecting up from the carrier frame. Said arm 100 is also formed with a depending lug 106 having a bolt opening 108 (see Fig. 5) formed for rocking engagement with one end of the bolt 110, the other end of which is slidingly mounted in an opening 112 formed in a lug 114 projecting down from the carrier frame 78. This bolt 110 is equipped with a nut 116 between which and said lug 114 a spring 118 is coiled about the bolt, whereby said holder 92 is yieldingly actuated in a forward direction to bring said roller 98 at the rear end of the inclined slot 96 so that the holder, whenever elevated is under a constant tendency to spring back into lowered position. The arm 100 is also provided intermediate the slots 102 with an upwardly extending lug 120 adapted, on forward swinging of the carrier, to engage a lug 122 depending from the under face of the plate 14, whereby further advance of the holder 92 is prevented and the same subjected to the action of the roller 98.

The carrier 78 also supports the cutting device which comprises a yoke or approximately U-shaped frame 124 pivotally mounted at 126 upon the carrier 78, and carrying, in advance of the die 90, a knife blade 128. The knife frame 124 is held normally elevated by a spring 130 secured to the carrier frame 78 and bearing upward against said frame 124. Thus when the knife frame is elevated, as illustrated in Fig. 5, the knife traverses a path directly across the mouth of the passage 26 for severing any portion of the butter which has been fed therethrough. Means is provided for lowering the knife blade out of its cutting path for clearing the space about the feed outlet as the knife is retraced, said means comprising a skeleton rocker arm 134 pivoted to the carrier at 135 and providing an operative edge having the recesses 136 and 138, which edge is adapted to have coöperative engagement with a pin 140 on the knife frame 124 (see Fig. 6). During the operative movements of the knife, said pin 140 is seated in the notch or recess 138; but as the carrier frame 78 approaches the forward limit of its movement, the arm 134 is brought into engagement with a tripping lug 142 depending from the plate 14, thereby rocking said arm 134 and causing the pin 140 to ride down into the recess 136 and lowering the knife carrying frame as indicated by the dotted lines Fig. 6. The knife carrying frame is held in this position during the entire return movement of the carrier 78 to the position represented in Fig. 3, whereupon the rocker arm 134 is engaged by the tripping member 144 and re-rocked into original position and the spring 130 thereby allowed to lift the knife frame back into its cutting path.

Following out the course of operation of the machine, butter or like material desired to be operated upon is placed in the receptacle 20, the valve 28 of which has been closed, and the receptacle then placed in position beneath the plunger 36. The feed wheel 44 is rotated rapidly by hand to initially press the butter into compact form within the receptacle, after which the valve 28 is opened preparatory to molding and cutting. Turning the wheel 68 operates the roller 62 to actuate the arm 74, thereby swinging the carrier 78 forward. The lug 120 of the die holder 92 is engaged by the stop lug 122 and said holder stopped with the die 90 opposite the mouth of the mold passage 26, and continued movement of the carrier elevates the die by the action of the roller 98, projecting said die within the mouth of the passage 26 and stamping the lower face of the butter therein. At the same time the arm 134 has been rocked by engagement with the lug 142, resulting in the lowering of the knife frame 124 so that the knife blade 128 is moved out of its cutting path to clear the portion of the butter which will be fed out through the passage 26 during the return movement of the carrier. This feeding movement is effected by engagement of the roller 62 with the lower arm of the lever 50, thereby actuating the pawl 48 and feed screw 38 a distance depending upon the position to which the plate 54 has been adjusted. The return of the carrier to initial position is effected by the action of its spring 86 immediately upon disengagement of the roller 62 from the arm 74, at which instant also the disengagement of lugs 120 and 122 permits the quick-acting spring 118 to retract the die from the mouth of the mold passage 26. Upon reaching initial or inoperative position, the knife blade is again raised into its cutting path by the spring 130, due to the tripping of the arm 134 by the tripping member 144; hence upon the next succeeding advance movement of the carrier, the knife blade sweeps across the mouth of the mold passage and severs the portion of butter which has just been fed therethrough. It will be noted that said knife blade is so positioned with relation to its path of movement as to effect a shearing action at the point of cutting, thus severing the molded and stamped portion of the butter neatly and effectively.

A special function is also served by the downward deflection of the knife blade from its cutting path, in addition to the purpose of providing for the knife's clearing the butter as it is fed out from the mold passage. This additional function is the inverting of the butter pats as they are severed by the knife so that they are allowed to fall with their stamped faces uppermost. The oily consistency of the butter is found to cause it to have a sufficient clinging tendency to adhere to the knife blade for a brief interval, and the described vibratory movement which is imparted to the latter immediately after the cutting action operates to free the severed butter pats and at the same time cause them to fall in inverted position. This is an advantage in that the stamped faces of the butter pats are not likely to be marred by this mode of delivery. Any suitable receiving platter or the like may be drawn beneath the mechanism for receiving the butter molds as delivered,—no such receiving means being shown since the same forms no part of the invention.

It will be apparent that a compact and efficient arrangement and construction have been devised for carrying out the desired objects of the invention. Obviously no special form of butter mass or mold is required to be placed in the receptacle 20, as small and large masses, irregularly shaped or otherwise, may alike be placed therein to be operated upon, the feeding action being the same in all cases and requiring only that the material be placed beneath the plunger, which thereupon acts to compact the same into a uniform mass and feed the same evenly through the mold passage. The arrangement dispenses with any separate molding action independent of that taking place at the feed outlet, and the essential operative movements and parts for accomplishing the desired results are reduced to practically a minimum.

While the foregoing represents what is now deemed to constitute the preferred form of embodiment of the invention, the right is reserved to all such formal changes and modifications as may fairly fall within the scope of the appended claims.

Claims:

1. A machine of the class described comprising a receptacle for holding plastic material and having a discharge opening, means for intermittently feeding the material out through said discharge opening, a knife mounted for reciprocatory movement across the mouth of said opening, means for actuating the knife to sever the material fed through said opening after each feeding movement, and means acting, at the conclusion of each severing operation, to impart a quick vibratory movement to the knife at right angles to the direction of its cutting movement for causing the severed material to be inverted as it drops from the knife.

2. A machine of the class described comprising a receptacle for holding plastic material and having a discharge opening, means for intermittently feeding the material out through said discharge opening, a knife mounted for reciprocatory movement across the mouth of said opening, said knife being mounted diagonally with reference to the direction of its movement for producing a draw-cut upon the material to be severed, and means for actuating said knife to sever the material fed through said discharge opening after each feeding movement.

3. A machine for molding and cutting butter or the like, comprising a butter receptacle provided with a molding outlet, a die movable bodily in a path approximately parallel to the plane of the mouth of said outlet into and out of operative position, means for feeding the butter through said outlet, means for moving said die through said path into operative position opposite the mouth of said outlet and thereafter actuating said die in the direction of said outlet to stamp the butter therein, and means for severing the stamped portion of the butter after each feeding operation.

4. In a machine for molding and cutting butter or the like, the combination of a butter receptacle provided with a molding outlet, a die and a knife movable in unison transversely of said outlet, means for feeding the butter through said outlet, means for transversely moving said die and knife and actuating the die in the direction of the outlet to stamp the butter when opposite the mouth of said outlet, and means acting to shift said knife out of its cutting path during the feeding operation.

5. In a machine for molding and cutting butter or the like, the combination of a butter receptacle provided with a molding outlet, means for feeding the butter through said outlet, a die and knife movable in unison transversely of said outlet with the knife in advance of the die, means for transversely moving said die and knife to effect cutting of the previously fed butter and position said die opposite the mouth of said outlet, and means acting while said die is opposite said outlet to cause the same to stamp the butter at the mouth of the outlet.

6. In a machine for molding and cutting butter or the like, the combination of a butter receptacle provided with a molding outlet, a die provided with means for actuating the same to stamp the butter at the mouth of said outlet, means for feeding the butter through said outlet, a knife movable transversely across the mouth of the outlet, means for actuating said knife after each feeding operation, and means acting at the conclusion of each cutting operation to impart a quick vibratory movement to the knife in a direction at right angles to the plane of the cutting movement of said knife for causing the severed material to be inverted as it drops from the knife.

7. In a machine for molding and cutting butter or the like, the combination of a butter receptacle provided with a molding outlet, means for intermittently feeding the butter through said outlet, a carrier movable transversely of said outlet and provided with a die and a knife mounted in advance of said die, means for transversely moving said carrier to cause said knife to cut the previously fed butter, and means acting at one limit of the carrier's movement to cause said die to stamp the butter at the mouth of said outlet and simultaneously deflect said knife from its cutting path.

8. In a machine for molding and cutting butter or the like, the combination of a butter receptacle provided with a molding outlet, means for intermittently feeding the butter through said outlet, a carrier movable transversely of said outlet and provided with a die and with a knife mounted in advance of said die, means for transversely moving said carrier to cause said knife to cut the previously fed butter, means acting at one limit of the carrier's movement to cause said die to stamp the butter at the mouth of said outlet and simultaneously deflect said knife from its cutting path, and means acting automatically to restore said knife to its cutting path as said carrier reaches the opposite limit of its movement.

9. In a machine for molding and cutting butter or the like, the combination of a butter receptacle provided with a molding outlet, means for intermittently feeding the butter through said outlet, a carrier movable transversely of said outlet, a die mounted on said carrier, means for transversely moving the carrier for positioning the die opposite said outlet at one limit of the carrier's movement, means for projecting the die into the mouth of said outlet when opposite the same, and means acting to retract said die from the outlet prior to the return movement of the carrier.

10. In a machine for molding and cutting butter or the like, the combination of a butter receptacle provided with a molding outlet, means for intermittently feeding the butter through said outlet, a carrier movable transversely of said outlet and provided with a die and with a knife mounted in advance of said die, means for transversely moving said carrier to cause said knife to cut the previously fed butter, and means acting at one limit of the carrier's movement to project said die into said outlet and retract the die therefrom prior to the return movement of the carrier while simultaneously deflecting said knife from its cutting path.

11. In a machine of the character described, the combination with a butter receptacle provided with a feed outlet, of means for feeding the butter through said outlet, a knife movable transversely across the mouth of said outlet, means for actuating said knife after each feeding operation, and means acting to impart a sharp vibratory movement to said knife in a direction at right angles to the plane of its cutting movement for causing the severed material to be inverted as it drops from the knife.

12. A machine for molding and cutting butter, comprising a butter receptacle provided with a bottom discharge opening, means for feeding the butter through said opening, a carrier pivoted for horizontal swinging movement across the mouth of said discharge opening, a die mounted on said carrier, a knife carried by said carrier in advance of said die, means for swinging said carrier to move said knife across said opening after each feeding operation and to bring said die into operative position opposite said opening, and means operating to project said die into said opening when in operative position.

ROY E. GEARHART.
ELDON E. LLOYD.